United States Patent
Fakoorian et al.

(10) Patent No.: US 11,570,597 B2
(45) Date of Patent: Jan. 31, 2023

(54) PILOT DESIGN FOR UPLINK (UL) NARROW-BAND INTERNET OF THINGS (NB-IOT)

(71) Applicant: QUALCOMM Incorporated, San Diego, CA (US)

(72) Inventors: Seyed Ali Akbar Fakoorian, San Diego, CA (US); Peter Gaal, San Diego, CA (US); Alberto Rico Alvarino, San Diego, CA (US); Xiaofeng Wang, San Diego, CA (US); Wanshi Chen, San Diego, CA (US); Renqiu Wang, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 657 days.

(21) Appl. No.: 15/397,934

(22) Filed: Jan. 4, 2017

(65) Prior Publication Data
US 2017/0230156 A1    Aug. 10, 2017

Related U.S. Application Data

(60) Provisional application No. 62/312,452, filed on Mar. 23, 2016, provisional application No. 62/309,331, (Continued)

(51) Int. Cl.
*H04W 4/70* (2018.01)
*H04W 72/08* (2009.01)
(Continued)

(52) U.S. Cl.
CPC ............. *H04W 4/70* (2018.02); *H04L 5/0051* (2013.01); *H04L 5/0064* (2013.01);
(Continued)

(58) Field of Classification Search
CPC .................. H04W 4/70; H04W 72/085; H04L 27/2613; H04L 5/0051; H04L 5/0064; H04L 25/0226; H04L 5/0094; H04B 7/0684
See application file for complete search history.

(56) References Cited

U.S. PATENT DOCUMENTS

2010/0046663 A1* 2/2010 Han ................... H04L 25/0226
                                                               375/295
2011/0085519 A1* 4/2011 Koivisto ................ H04J 13/00
                                                               370/335
(Continued)

FOREIGN PATENT DOCUMENTS

CN        101645868 A        2/2010
CN        102132503 A        7/2011
(Continued)

OTHER PUBLICATIONS

3GPP TS 36.331 v13.0.0 Jan. 2016, pp. 272, 375, 381 (Year: 2016).*
(Continued)

*Primary Examiner* — Un C Cho
*Assistant Examiner* — Yu-Wen Chang
(74) *Attorney, Agent, or Firm* — Qualcomm Incorporated

(57) ABSTRACT

Certain aspects of the present disclosure relate to methods and apparatus for pilot design for Narrow-Band Internet of Things (NB-IoT). In certain aspects, the method generally includes determining at least one binary code sequence to use as a demodulation reference signal (DMRS) for a channel transmitted across one or more subframes using one or more tones within a resource block (RB) allocated to the UE for narrowband communication, and transmitting the channel including the DMRS using the one or more tones and the determined binary code sequence. In certain aspects,
(Continued)

the binary code sequence may be determined based on a binary random sequence, such as pseudo noise (PN) or Gold sequence.

54 Claims, 8 Drawing Sheets

Related U.S. Application Data filed on Mar. 16, 2016, provisional application No. 62/292,830, filed on Feb. 8, 2016.

(51) Int. Cl.
*H04L 5/00* (2006.01)
*H04L 27/26* (2006.01)
*H04B 7/06* (2006.01)
*H04L 25/02* (2006.01)

(52) U.S. Cl.
CPC ....... *H04L 27/2613* (2013.01); *H04W 72/085* (2013.01); *H04B 7/0684* (2013.01); *H04L 5/0094* (2013.01); *H04L 25/0226* (2013.01)

(56) References Cited

U.S. PATENT DOCUMENTS

| | | | | |
|---|---|---|---|---|
| 2011/0134867 | A1* | 6/2011 | Lee | H04L 5/0023 370/329 |
| 2012/0213311 | A1 | 8/2012 | Park et al. | |
| 2014/0098782 | A1* | 4/2014 | Shirazi | H04J 13/0003 370/330 |
| 2014/0376356 | A1 | 12/2014 | Park et al. | |
| 2015/0236883 | A1 | 8/2015 | Yoon | |
| 2016/0119947 | A1* | 4/2016 | Park | H04B 7/024 370/329 |
| 2016/0269980 | A1* | 9/2016 | Simon | H04L 27/2613 |
| 2017/0202014 | A1* | 7/2017 | Moon | H04B 7/0626 |
| 2017/0288835 | A1* | 10/2017 | Kim | H04L 5/0048 |

FOREIGN PATENT DOCUMENTS

| | | |
|---|---|---|
| CN | 102769592 A | 11/2012 |
| EP | 2665221 A2 | 11/2013 |
| EP | 3026967 A1 * | 2/2016 ............ H04W 56/00 |
| JP | 2013504278 A | 2/2013 |
| JP | 2014533051 A | 12/2014 |
| JP | 2015521004 A | 7/2015 |
| TW | 201445947 A | 12/2014 |
| WO | 2012147273 A1 | 11/2012 |
| WO | 2013125840 A1 | 8/2013 |
| WO | 2015037885 A1 | 3/2015 |

OTHER PUBLICATIONS

Ozadam et al., "The Minimum Hamming Dustance of Cyclic Codes of Length 2p8" AAECC 2009, pp. 92-100 (Year: 2009).*
"3rd Generation Partnership Project; Technical Specification Group Radio Access Network; Evolved Universal Terrestrial Radio Access (E-UTRA); Physical channels and modulation (Release 13)," 3GPP Standard; 3GPP TS 36.211, 3rd Generation Partnership Project (3GPP), Mobile Competence Centre ; 650, Route Des Lucioles ; F-06921 Sophia-Antipolis Cedex ; France, Jan. 5, 2016 (Jan. 5, 2016), vol. RAN WG1, No. V13.0.0, pp. 1-141, XP051047447, [retrieved on Jan. 5, 2016].
Ericsson: "NB-IoT—Design Considerations for UL Reference Signals," 3GPP Draft; R1-160092—NB-IOT—Design Considerations for UL Reference Signals, 3rd Generation Partnership Project (3GPP), Mobile Competence Centre ; 650, Route Des Lucioles ; F-06921 Sophia-Antipolis vol. RAN WG1, No. Budapest. HU; Jan. 18, 2016-Jan. 20, 2816 Jan. 12, 2016 (Jan. 12, 2016), XP051064705, Retrieved from the Internet: URL:http://www.3gpp.org/ftp/tsg_ran/WG1_RL1/TSGR1_AH/LTE_NB-IoT_1601/Docs/—[retrieved on Jan. 12, 2016] Sect.s 1-5, 3 pages.
International Search Report and Written Opinion—PCT/US2017/012370—ISA/EPO—dated Mar. 29, 2017.
Nokia Networks et al., "On UL DMRS Design for NB-IoT," 3GPP Draft; R1-160455, 3rd Generation Partnership Project (3GPP), Mobile Competence Centre ; 650, Route Des, Lucioles ; F-06921 Sophia-Antipolis Cedex, France vol. RAN WG1, No. St Julian's, Malta; Feb. 15, 2016-Feb. 19, 2016 Feb. 5, 2016 (Feb. 5, 2016). XP051063780, Retrieved from the Internet: URL:http://www.3gpp.org/ftp/tsg_ran/WG1_RL1/TSGR1_84/Docs/ [retrieved on Feb. 5, 2016], 4 pages.
LG Electronics: "S-SCH Sequence Design", 3GPP TSG RAN WG1 #47 bis, 3GPP Draft; R1-070231, 3rd Generation Partnership Project (3GPP), Mobile Competence Centre; 650, Route Des Lucioles; F-06921 Sophia-Antipolis Cedex; France, vol. RAN WG1, No. Sorrento, Italy; Jan. 15, 2007-Jan. 19, 2007, pp. 1-10, Jan. 10, 2007, XP050104270.
Taiwan Search Report—TW106100241—TIPO—dated Jul. 13, 2020.

* cited by examiner

PILOT DESIGN FOR UPLINK (UL) NARROW-BAND INTERNET OF THINGS (NB-IOT)

CROSS-REFERENCE TO RELATED APPLICATIONS

This application claims benefit of priority to provisional application No. 62/292,830, filed Feb. 8, 2016, provisional application No. 62/309,331, filed Mar. 16, 2016, provisional application No. 62/312,452, filed Mar. 23, 2016, which are expressly incorporated herein by reference in their entirety.

BACKGROUND

Field of the Disclosure

The present disclosure relates generally to wireless communication, and more particularly, to methods and apparatus for pilot design for Narrow-Band Internet of Things (NB-IoT).

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). However, as the demand for mobile broadband access continues to increase, there exists a need for further improvements in LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed. After considering this discussion, and particularly after reading the section entitled "DETAILED DESCRIPTION" one will understand how the features of this disclosure provide advantages that include improved communications between access points and stations in a wireless network.

The present disclosure relates generally to wireless communication, and more particularly, to pilot design for Narrow-Band Internet of Things (NB-IoT).

Certain aspects of the present disclosure provide a method for wireless communications by a User Equipment (UE). The method generally includes determining at least one binary code sequence to use as a demodulation reference signal (DMRS) for a channel transmitted across one or more subframes using one or more tones within a resource block (RB) allocated to the UE for narrowband communication, wherein the binary code sequence is determined based on a binary random sequence, and transmitting the channel including the DMRS using the one or more tones and the determined binary code sequence.

Certain aspects of the present disclosure provide an apparatus for wireless communications. The apparatus generally includes at least one processor configured to determine at least one binary code sequence to use as a demodulation reference signal (DMRS) for a channel transmitted across one or more subframes using one or more tones within a resource block (RB) allocated to the UE for narrowband communication, wherein the binary code sequence is determined based on a binary random sequence, and transmit the channel including the DMRS using the one or more tones and the determined binary code sequence, and memory coupled to the at least one processor.

Certain aspects of the present disclosure provide an apparatus for wireless communications. The apparatus generally includes means for determining at least one binary code sequence to use as a demodulation reference signal (DMRS) for a channel transmitted across one or more subframes using one or more tones within a resource block (RB) allocated to the UE for narrowband communication, wherein the binary code sequence is determined based on a binary random sequence, and means for transmitting the channel including the DMRS using the one or more tones and the determined binary code sequence.

Certain aspects of the present disclosure provide a computer-readable medium having instructions stored thereon for determining at least one binary code sequence to use as a demodulation reference signal (DMRS) for a channel transmitted across one or more subframes using one or more tones within a resource block (RB) allocated to the UE for narrowband communication, wherein the binary code sequence is determined based on a binary random sequence, and transmitting the channel including the DMRS using the one or more tones and the determined binary code sequence.

Certain aspects of the present disclosure provide a method for wireless communications by a base station. The method generally includes determining at least one binary code sequence that is a candidate for use as a demodulation reference signal (DMRS) for a channel transmitted, by a user equipment (UE), across one or more subframes using one or more tones within a resource block (RB) allocated to the UE for narrowband communication, wherein the binary code sequence is determined based on a binary random sequence, and monitoring the one or more tones during the one or more subframes for the channel including the DMRS using the one or more tones and the determined binary code sequence.

Certain aspects of the present disclosure provide an apparatus for wireless communications. The apparatus generally includes at least one processor configured to determine at least one binary code sequence that is a candidate for use as a demodulation reference signal (DMRS) for a channel transmitted, by a user equipment (UE), across one or more subframes using one or more tones within a resource block (RB) allocated to the UE for narrowband communication, wherein the binary code sequence is determined based on a binary random sequence, and monitor the one or more tones during the one or more subframes for the channel including the DMRS using the one or more tones and the determined binary code sequence, and memory coupled to the at least one processor.

Certain aspects of the present disclosure provide an apparatus for wireless communications. The apparatus generally includes means for determining at least one binary code sequence that is a candidate for use as a demodulation reference signal (DMRS) for a channel transmitted, by a user equipment (UE), across one or more subframes using one or more tones within a resource block (RB) allocated to the UE for narrowband communication, wherein the binary code sequence is determined based on a binary random sequence, and means for monitoring the one or more tones during the one or more subframes for the channel including the DMRS using the one or more tones and the determined binary code sequence.

Certain aspects of the present disclosure provide a computer-readable medium having instructions stored thereon for determining at least one binary code sequence that is a candidate for use as a demodulation reference signal (DMRS) for a channel transmitted, by a user equipment (UE), across one or more subframes using one or more tones within a resource block (RB) allocated to the UE for narrowband communication, wherein the binary code sequence is determined based on a binary random sequence, and monitoring the one or more tones during the one or more subframes for the channel including the DMRS using the one or more tones and the determined binary code sequence.

Other aspects, features, and embodiments of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the present disclosure. In similar fashion, while exemplary aspects may be discussed below as device, system, or method aspects it should be understood that such exemplary aspects can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
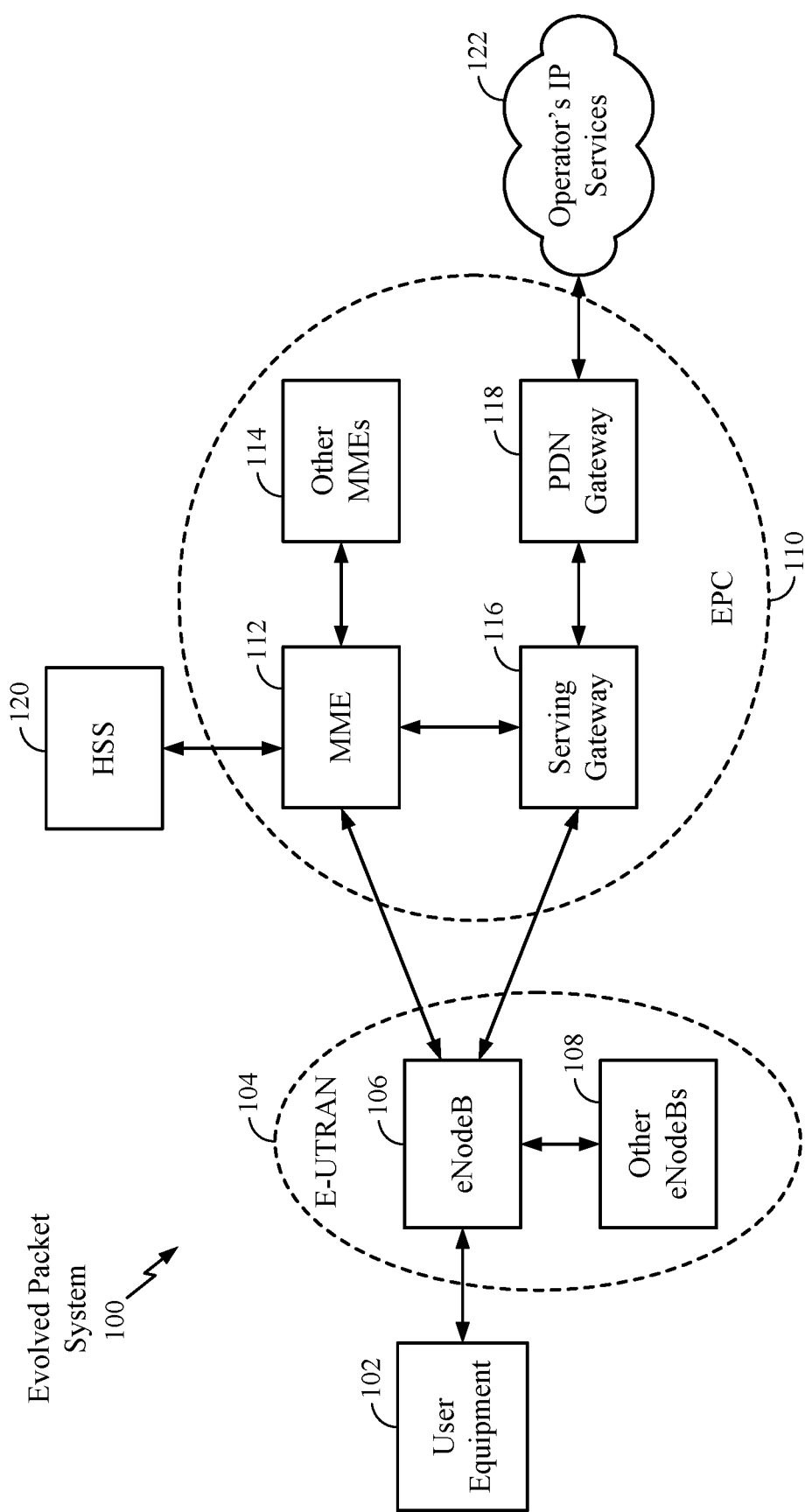
FIG. 1 is a diagram illustrating an example of a network architecture.

Narrow-Band IoT (NB-IoT) is a technology being standardized by the 3GPP standards body. This technology is a narrowband radio technology specially designed for the IoT, hence its name. Special focuses of this standard include indoor coverage, low cost, long battery life and large number of devices. The NB-IoT technology may be deployed "in-band", utilizing resource blocks within, for example, a normal long term evolution (LTE) spectrum or Global System for Mobile communications (GSM) spectrum. In addition, NB-IoT may be deployed in the unused resource blocks within a LTE carrier's guard-band, or "standalone" for deployments in dedicated spectrum. Aspects of the present disclosure are generally directed to the design of binary code sequences used for transmission of reference signals for NB-IoT.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. LTE, LTE-Advanced, and other releases of LTE are collectively referred to as LTE. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These communications networks are merely listed as examples of networks in which the techniques described in this disclosure may be applied; however, this disclosure is not limited to the above-described communications network.

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn attention, especially in the uplink (UL) communications where lower PAPR greatly benefits the wireless node in terms of transmit power efficiency.

Aspects of the present disclosure provide methods and apparatus for an uplink design for NB-IoT.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some implementations, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart/virtual reality glasses/googles, smart/virtual reality helmets/headsets, smart bracelet, smart wristband, smart ring, smart jewelry, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a positioning/navigation device (e.g., GPS, Beidou, Glonass, Galileo, terrestrial based, etc.), or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later.

Example Wireless Communications System

FIG. 1 is a diagram illustrating an LTE network architecture 100 in which aspects of the present disclosure may be practiced. For example UE 102 may receive an uplink grant from an eNB 106 or 108 indicating one or more tones within a resource block (RB) allocated to the UE for narrowband communication. The UE 102 may then transmit using the one or more tones indicated in the uplink grant.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, a camera/security camera, a gaming device, a wearable device (e.g., smart watch, smart glasses, smart ring, smart bracelet, smart wrist band, smart jewelry, smart clothing, etc.), any other similar functioning device, etc. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
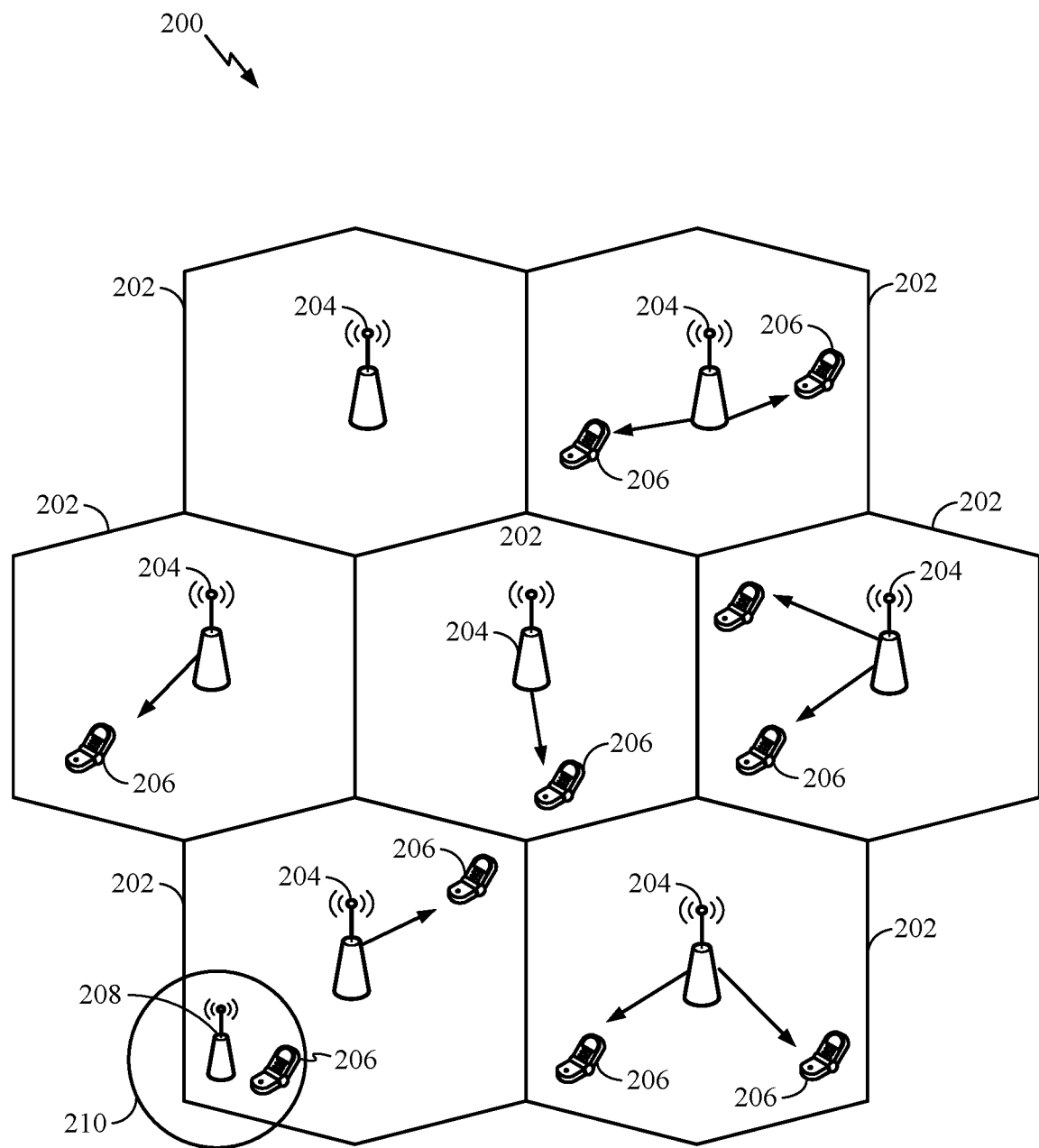
FIG. 2 is a diagram illustrating an example of an access network.

FIG. 2 is a diagram illustrating an example of an access network 200 in an LTE network architecture in which aspects of the present disclosure may be practiced. For example, UEs 206 and eNBs 204 may be configured to implement techniques for implementing a new transmission scheme for NB-IoT described in aspects of the present disclosure.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network may be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
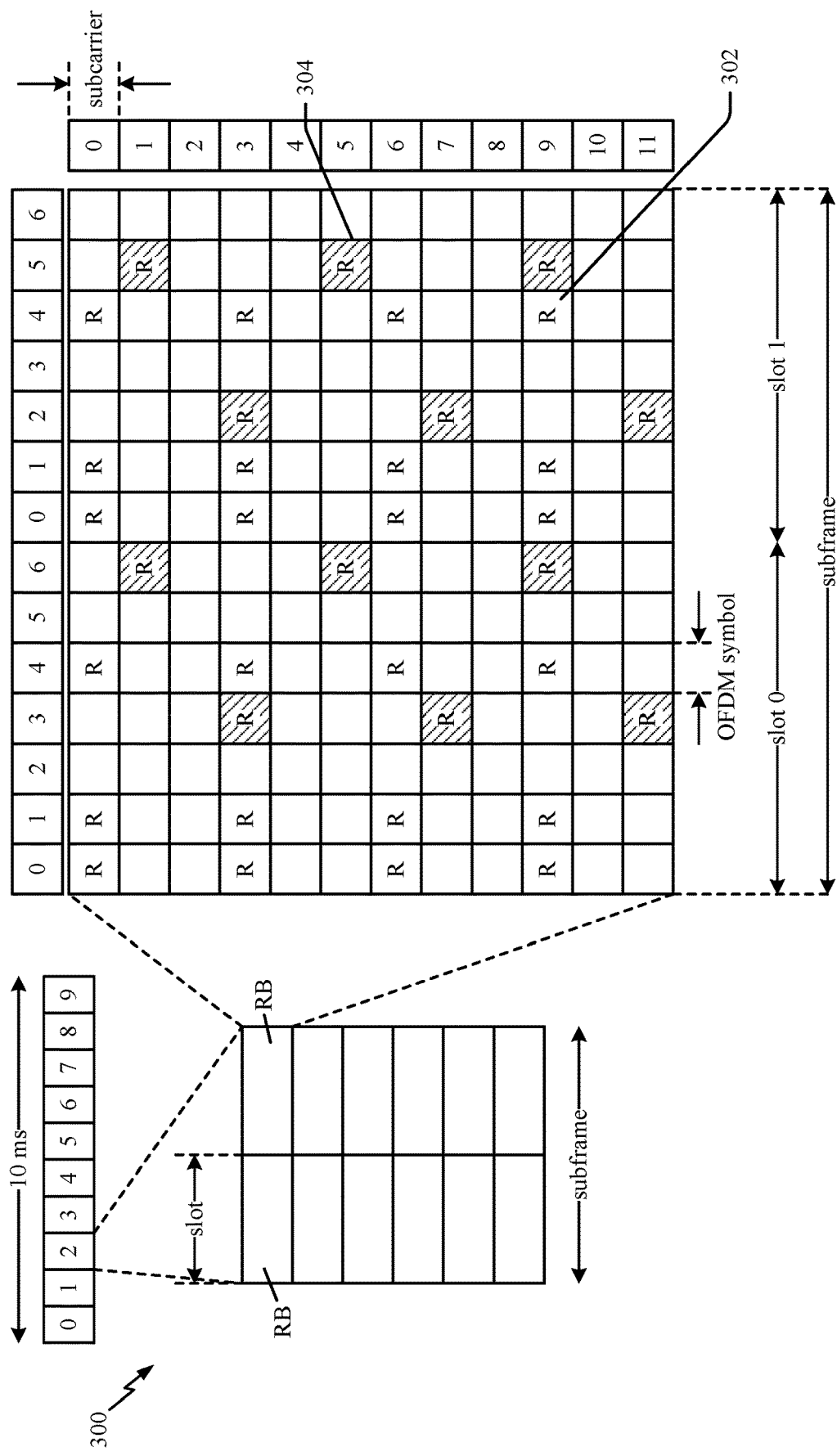
FIG. 3 is a diagram illustrating an example of a downlink (DL) frame structure in long-term evolution (LTE).

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
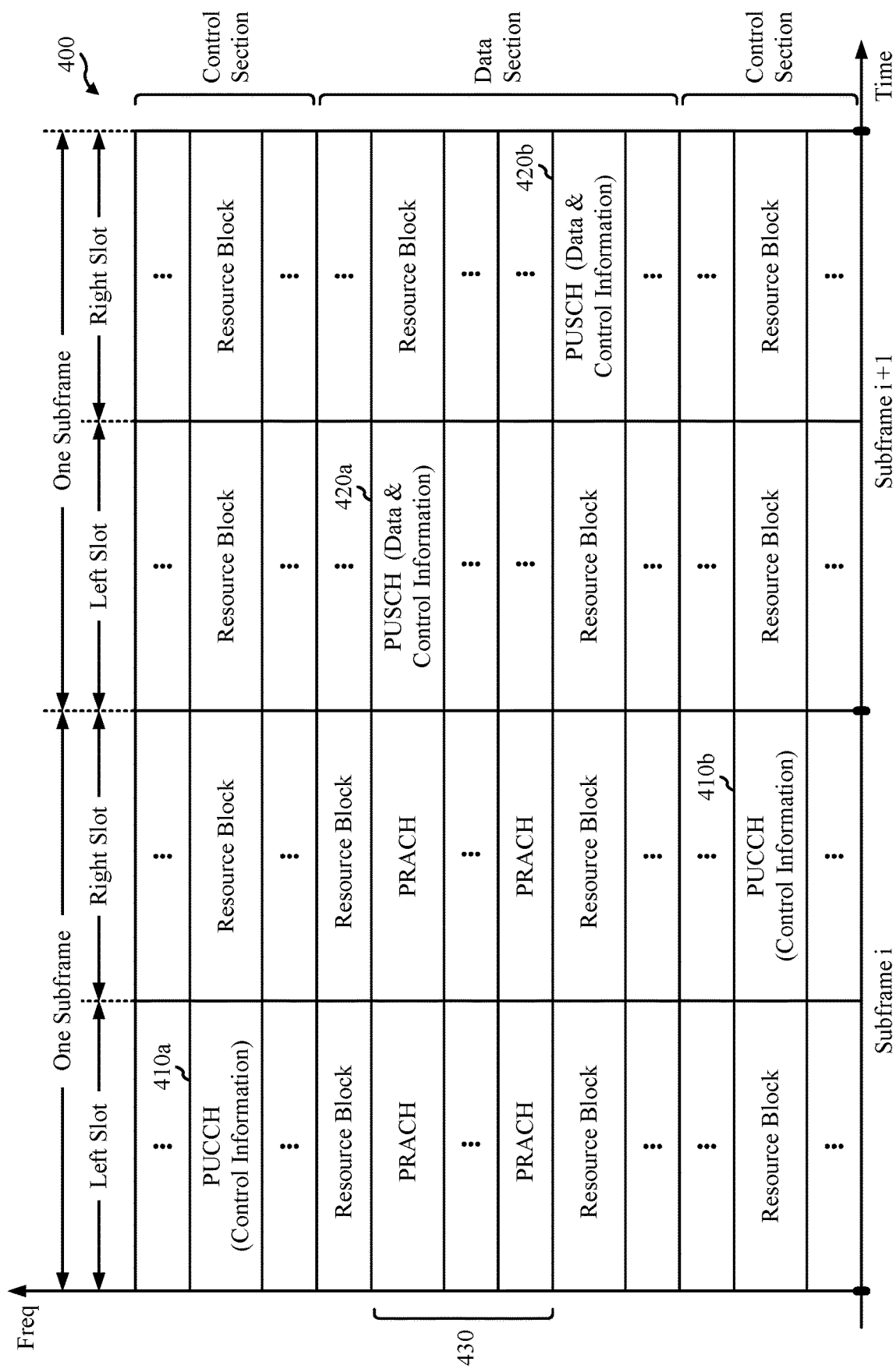
FIG. 4 is a diagram illustrating an example of an uplink (UL) frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
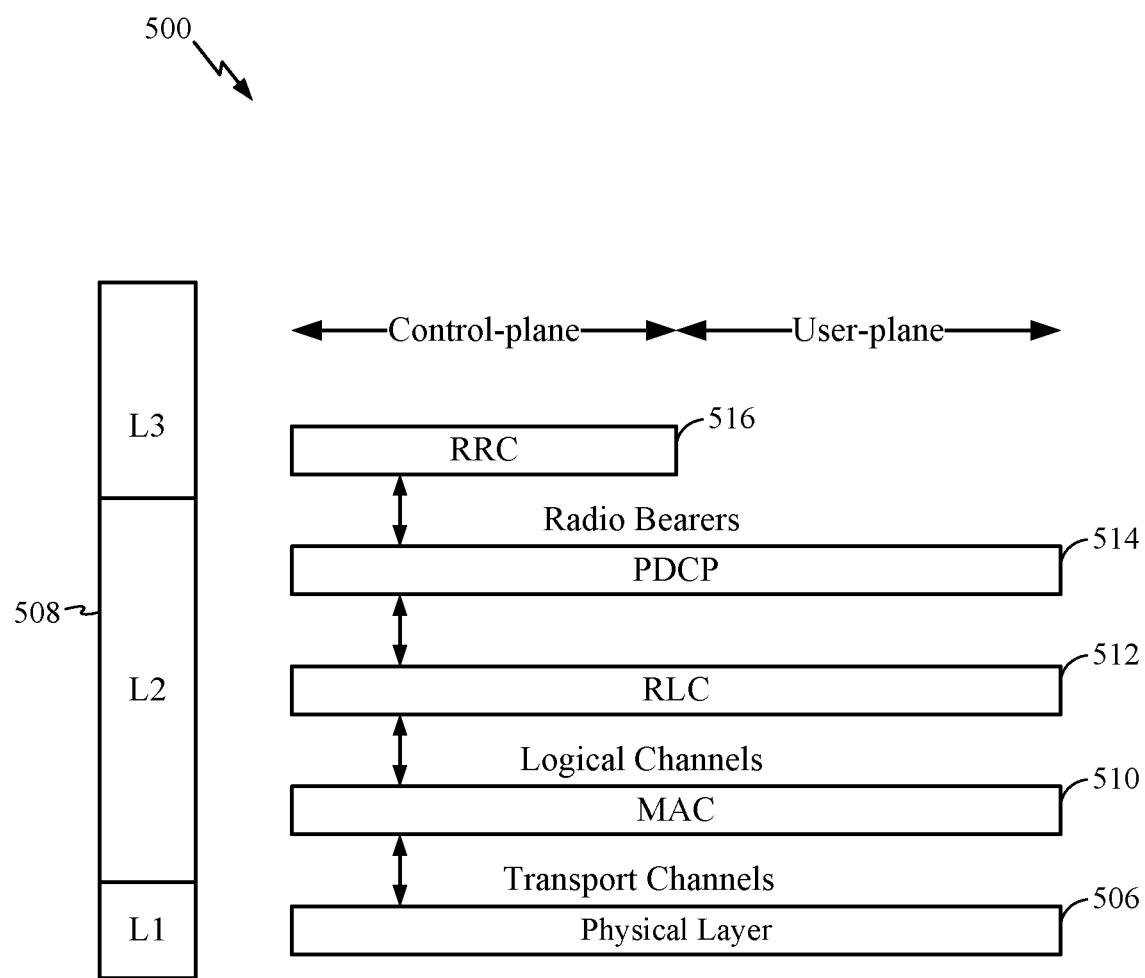
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
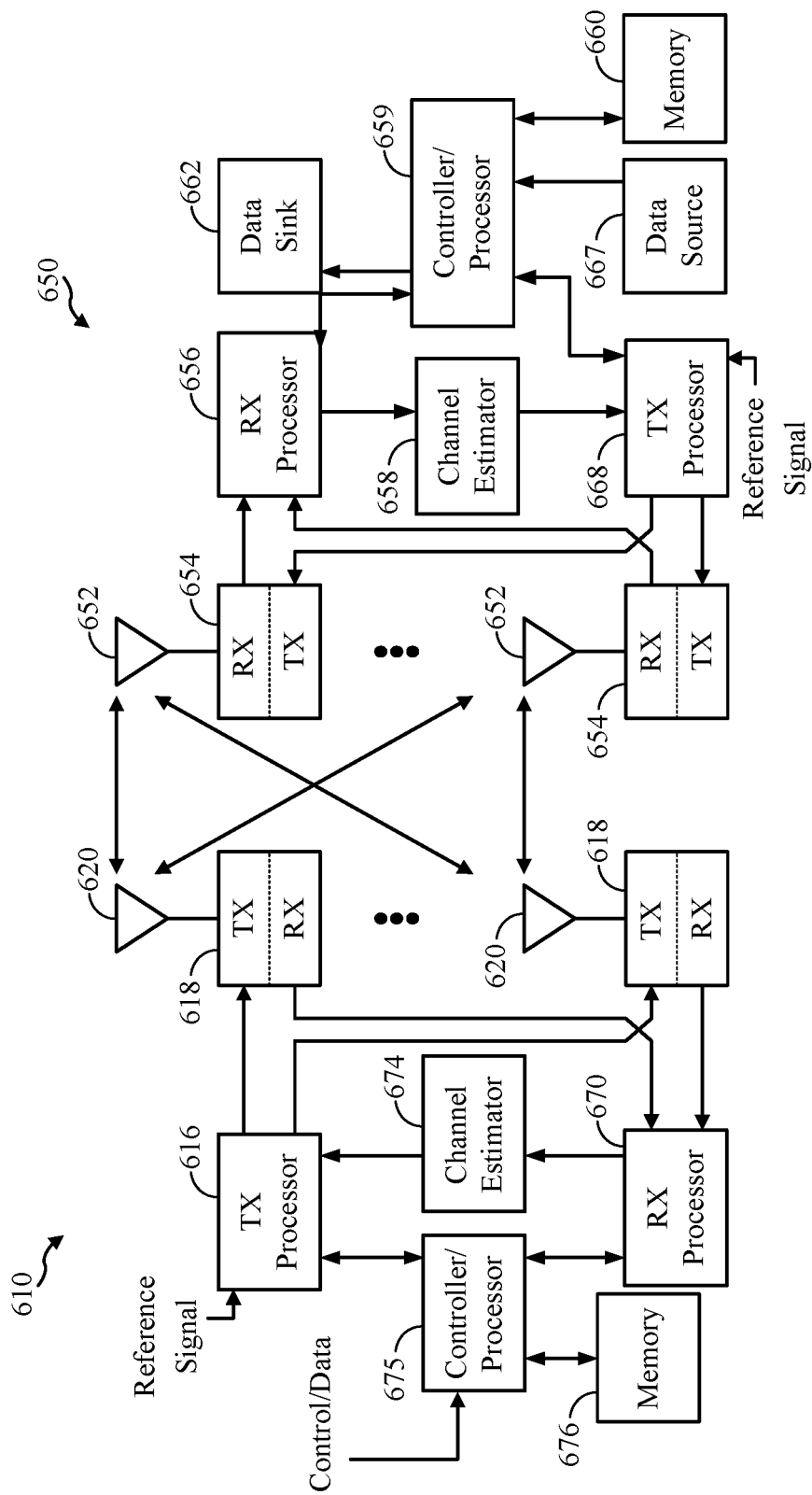
FIG. 6 is a diagram illustrating an example of an evolved Node B and user equipment (UE) in an access network, in accordance with certain aspects of the disclosure.

FIG. 6 is a block diagram of an eNB 610 in communication with a UE 650 in an access network, in which aspects of the present disclosure may be practiced.

In certain aspects, a UE (e.g., UE 650) combines pairs of antenna ports to generate at least first and second combined antenna ports. For each combined port, the UE adds reference signals received on Resource Elements (REs) of each of the combined pair of antenna ports. The UE then determines channel estimates for each combined antenna port based on the added reference signals for the combined port. In certain aspects, for each of the combined ports, the UE processes data received on data REs in pairs, based on the determined channel estimates of the combined port.

In certain aspects, a Base Station (BS) (e.g., eNB 610) combines pairs of antenna ports to generate the at least first and second combined antenna ports, for transmission in a narrow band region of a larger system bandwidth. For each of the first and the second combined antenna ports, the BS transmits same data on corresponding REs of each of the combined pairs of antenna ports, wherein a receiving UE determines channel estimates for each of the first and second combined ports, and processes the data received in the REs in pairs based on the determined channel estimates.

It may be noted that the UE noted above for implementing the new transmission scheme for NB IoT in accordance with certain aspects of the present disclosure may be implemented by a combination of one or more of the controller/processor 659, the RX processor 656, the channel estimator 658 and/or transceiver 654 at the UE 650, for example. Further, the BS may be implemented by a combination of one or more of the controller 675, the TX processor and/or the transceiver 618 at the eNB 610.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

Figure 8:
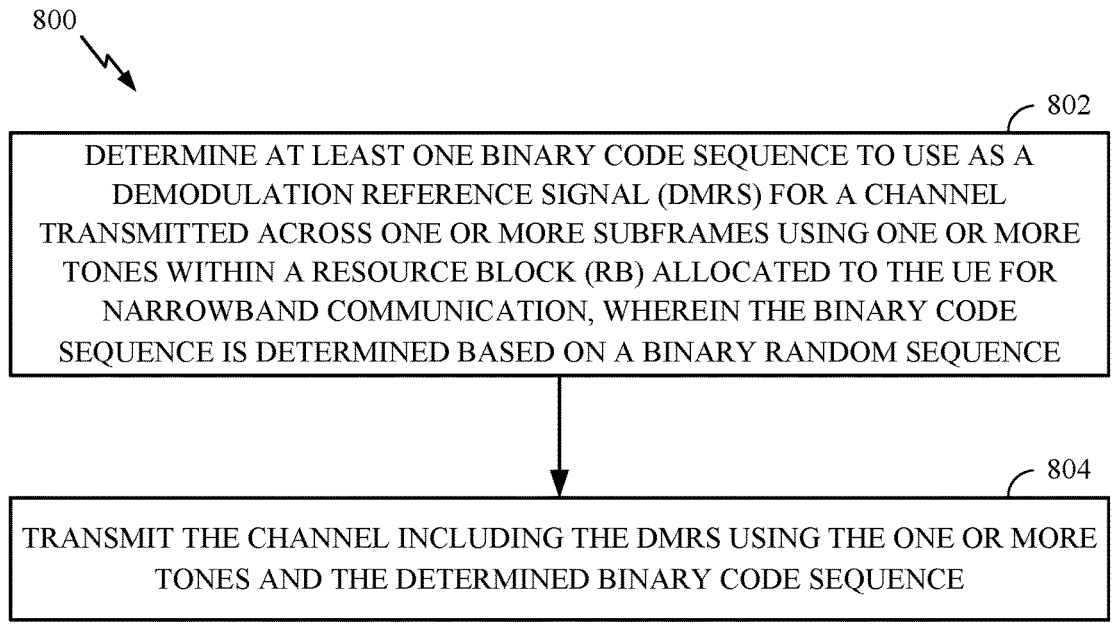
FIG. 8 illustrates example operations performed by a UE for wireless communication, in accordance with certain aspects of the present disclosure.

The controller/processor 659 and/or other processors, components and/or modules at the UE 650 may perform or direct operations, for example, operations 800 in FIG. 8, and/or other processes for the techniques described herein for implementing the new transmission scheme. Further, the controller/processor 675 and/or other processors, components and/or modules at the eNB 610 may perform or direct operations, for example, operations 900 in FIG. 9, and/or other processes for the techniques described herein for implementing the new transmission scheme. In certain aspects, one or more of any of the components shown in FIG. 6 may be employed to perform example operations 800 and 900, and/or other processes for the techniques described herein. The memories 660 and 676 may store data and program codes for the UE 650 and eNB 610 respectively, accessible and executable by one or more other components of the UE 650 and the eNB 610.

Narrow Band Internet-of-Things (NB-IoT)

The Internet-of-Things (IoT) is a network of physical objects or "things" embedded with, for example, electronics, software, sensors, and network connectivity (e.g., wireless, wireline, positioning, etc.), which enable these objects to collect and exchange data. IoT allows objects to be sensed and controlled remotely across existing network infrastructure, creating opportunities for more direct integration between the physical world and computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each "thing" is generally uniquely identifiable through its embedded computing system but is able to interoperate within the existing Internet infrastructure.

Narrow-Band IoT (NB-IoT) is a technology being standardized by the 3GPP standards body. This technology is a narrowband radio technology specially designed for the IoT, hence its name. Special focuses of this standard are on indoor coverage, low cost, long battery life and large number of devices.

The NB-IoT technology may be deployed "in-band", utilizing resource blocks within, e.g., a normal LTE or GSM spectrum. In addition, NB-IoT may be deployed in the unused resource blocks within a LTE carrier's guard-band, or "standalone" for deployments in dedicated spectrum.

Uplink multi-tone transmission of data may be supported for 3 tones, 6 tones, and 12 tones. A transmission block can be scheduled over more than one resource unit in time.

Certain devices may communicate using narrowband regions of system bandwidth, such as narrowband internet of things (NB-IoT) devices. To reduce the complexity of UEs, NB-IoT may allow for deployments utilizing one Physical Resource Block (PRB) (180 kHz+20 kHz guard band). NB-IoT deployments may utilize higher layer components of LTE and hardware to allow for reduced fragmentation and cross compatibility with, for example, NB-LTE and eMTC (enhanced or evolved Machine Type Communications).

Figure 7:
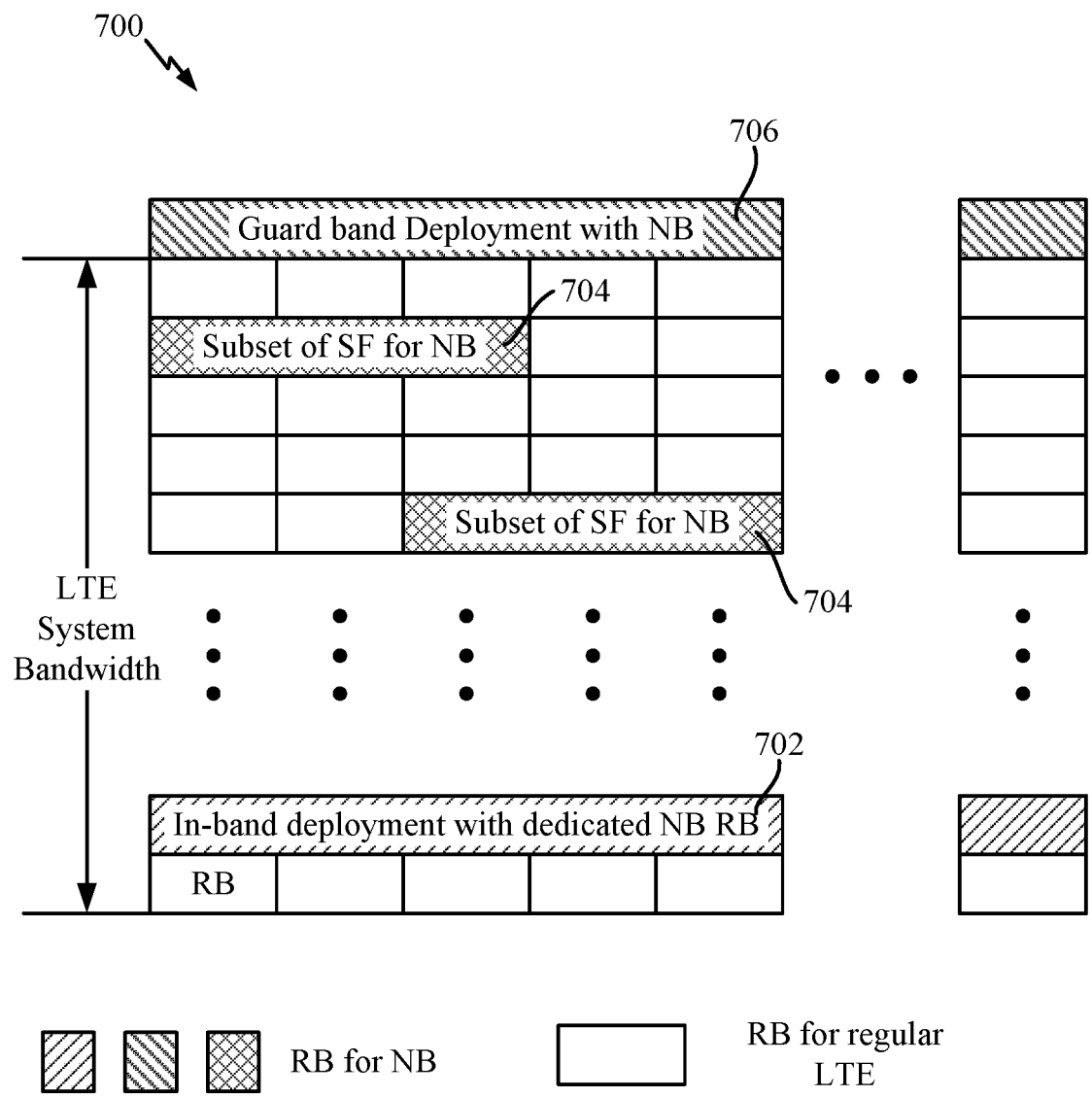
FIG. 7 illustrates an example deployment of narrow-band internet of things (NB-IoT), according to certain aspects of the present disclosure.

FIG. 7 illustrates an example deployment 700 of NB-IoT, according to certain aspects of the present disclosure. According to certain aspects, NB-IoT may be deployed in three broad configurations. In certain deployments, NB-IoT may be deployed in-band and coexist with legacy GSM/WCDMA/LTE system(s) deployed in the same frequency band. Wideband LTE channel, for example, may be deployed in, e.g., various bandwidths between 1.4 MHz to 20 MHz, and there may be a dedicated RB 702 available for use by NB-IoT, or the RBs allocated for NB-IoT may be dynamically allocated 704. In an in-band deployment, one resource block (RB), or 200 kHz, of a wideband LTE channel may be used for NB-IoT. LTE implementations may include unused portions of radio spectrum between carriers to guard against interference between adjacent carriers. In some deployments, NB-IoT may be deployed in a guard band 706 of the wideband LIE channel. In other deployments, NB-IoT may be deployed standalone (not shown). In a standalone deployment, for example, one 200 MHz kHz carrier may be utilized to carry NB-IoT traffic and GSM spectrum may be reused.

Deployments of NB-IoT may include synchronization signals such as PSS for frequency and timing synchronization and SSS to convey system information. According certain aspects of the present disclosure, synchronization signals of NB-IoT operations occupy narrow channel bandwidths and can coexist with legacy GSM/WCDMA/LTE system(s) deployed in the same frequency band. NB-IoT operations may include PSS/SSS timing boundaries. In certain aspects, these timing boundaries may be extended as compared to the existing PSS/SSS frame boundaries in legacy LTE systems (e.g., 10 ms) to, for example, 40 ms. Based on the timing boundary, a UE is able to receive a PBCH transmission, which may be transmitted in subframe 0 of a radio frame.

Various modulations schemes may be supported. Modulation schemes can include single tone modulation schemes, multi-tone modulation schemes with single-carrier frequency division multiplexing (SC-FDM), multi-tone modulation schemes with tone phase shift keying (TPSK) where information is transmitted in one tone and by tone position, and 8 binary phase shift keying (BPSK) corresponding to constrained 8-PSK modulation with reduced peak-to-average power ratio (PAPR) (e.g., near 0 dB). It may be desirable for downlink control information (DCI) to indicate the modulation scheme as well as the resource allocation.

Example Pilot Design for Narrow Band Internet-of-Things (Nb-IoT)

In Radio Access Network1 (RAN1) narrow band (NB) internet of things (IoT) AdHoc, it was agreed that a single-tone transmission may include 8 ms at least for Frequency Division Duplex (FDD). UL multi-tone transmission for data may also include three or four tone transmission. For 3 tone transmission, a 4 ms resource unit size (e.g., 4 subframes) may be used, and for 6 tone transmission, a 2 ms resource unit size (e.g., 2 subframes) may be used. Moreover, when multi-tone is allocated, QPSK modulation scheme may be supported.

Certain aspects of the present disclosure provide pilot design for single-tone and multi-tone transmissions.

FIG. 8 illustrates example operations 800 for wireless communication, in accordance with certain aspects of the present disclosure. The operations 800 may be performed by an IoT device, such as a UE (e.g., UEs 102, 206, 650).

The operations 800 begin, at 802, by determining at least one binary code sequence to use as a demodulation reference signal (DMRS) for a channel transmitted across one or more subframes using one or more tones within a resource block (RB) allocated to the UE for narrowband communication, wherein the binary code sequence is determined based on a binary random sequence. At 804, the IoT device may transmit the channel including the DMRS using the one or more tones and the determined binary code sequence.

Figure 9:
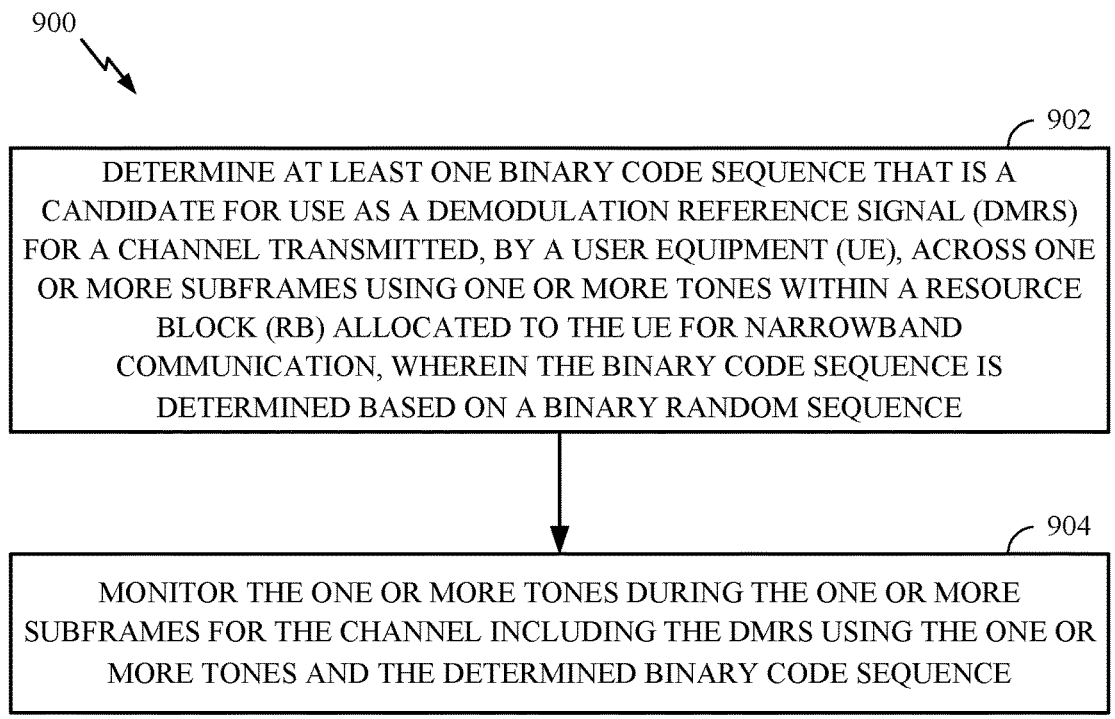
FIG. 9 illustrates example operations performed by a base station for wireless communication, in accordance with certain aspects of the present disclosure.

FIG. 9 illustrates example operations 900 for wireless communication, in accordance with certain aspects of the present disclosure. The operations 900 may be performed by an IoT device, such as a base station (e.g., eNBs 106, 108, 204, 610).

The operations 900 begin, at 902, by determining at least one binary code sequence that is a candidate for use as a demodulation reference signal (DMRS) for a channel transmitted, by a user equipment (UE), across one or more subframes using one or more tones within a resource block (RB) allocated to the UE for narrowband communication, wherein the binary code sequence is determined based on a binary random sequence. At 904, the IoT device monitors the one or more tones during the one or more subframes for the channel including the DMRS using the one or more tones and the determined binary code sequence.

In certain aspects, where a channel comprises a single tone, a systematic binary sequence design may be used for the DMRS. In some case, a length of the binary code sequence may depend on a bundling length of the channel. For single-tone transmission, the DMRS sequence length may be 8, 16, 32 or even more (e.g., in case of TTI bundling). The systematic binary sequence may be used as a DMRS sequence. For example, the systematic binary sequence may include a Hadamard sequence or Reed-Muller sequence as described in more detail herein. In some cases, the systematic binary sequence may be obtained from a binary code-block with good minimum Hamming distance.

For example, for a length 8 binary DMRS sequence, an example of such code-blocks may be obtained by Reed-Muller code (RM(1,3)), as follows:

$$RM(1,3)=[v_0;v_1;v_2;v_3]$$

where $v_0$, $v_1$, $v_2$, and $v_3$ are basis vectors, and $v_0$ is an all 1 vector. In this case, the minimum distance may be four. RM(1,3) has 16 code-words, each of length 8. The 16 codewords may be grouped into two groups of 8 codewords, which may be referred to as a 8×8 Hadamard matrix ($H_8$). Each of the groups of 8 codewords may be orthogonal to each other. Each code word may be a linear combination of the four basis vectors, as follows:

$$CW_k=i_0v_0+i_1v_1+i_2v_2+i_3v_3$$

where $k=(i_0i_1i_2i_3)$ in binary. If $i_0$ is binary 0, then the corresponding code-words $CW_k$ may be orthogonal (e.g., having orthogonal columns) and make an 8×8 Hadamard matrix ($H_8$), for example. If $i_0$ is 1, then the corresponding code-words $CW_k$ may be orthogonal and make another Hadamard matrix ($\bar{H}_8$), where $\bar{H}_8=-H_8$ (e.g., flipped).

For example, for length 8 binary DMRS sequence, sequences from $H_8$ may be selected. However, in some cases, the sequences can be selected from $\hat{H}_8$ as another option. This may result in 8 groups of resources. To increase the group size to 16, for length 8 sequences, two Hadamard sequences, each of length 8, may be concatenated. For example, sequences from $[H_8; \bar{H}_8]$ may be selected. However, in this case, the sequences may no longer be orthogonal.

In certain aspects, the group of sequences may be selected from another binary code-book with high enough minimum distance. For example, the group of sequences may be selected from a cyclic code book. Moreover, similar to length 8 sequences, Hadamard matrices for systematic design of other sequence lengths may be used. For example, a 16×16 Hadamard sequence ($H_{16}$) may be used to obtain (e.g., for DMRS) 16 groups of sequences, each having a length of 16.

In certain aspects, the DMRS sequence may be designed by applying an element-wise product of the binary codeword (for example Hadamard or cyclic code) and a pseudo noise (PN) or Gold sequence based binary random sequence (e.g., to randomize the Hadamard sequence). For example, in some cases, the element wise product may comprise the product of a Hadamard sequence (e.g., one row of a Hadamard matrix) and a PN or Gold sequence based binary random sequence. In some cases, the element-wise product may include the product of a codeword from a linear cyclic code and a PN or Gold sequence based binary random sequence. In certain aspects, whether a Hadamard sequence or a linear cyclic code is used for the element-wise product may depend on a ratio of the number of sequences to the sequence length.

In certain aspects, the Gold sequence or PN sequence may be common among multiple cells (e.g., not cell_id dependent). In certain aspects, the Hadamard sequence or codeword from a linear cyclic code may be cell_id dependent. In some cases, code division multiplexing (CDM) may be precluded within the same cell. In certain aspects, Gold sequence or PN sequence may be reset in the first symbol of the binary code sequence transmission.

Certain aspects of the present disclosure provide a pilot design for multi-tone allocation with TPSK. For TPSK, the reference signal sequence may be the same as for single tone allocation. For example, in some aspects, for a sequence length of 16 (e.g., 8 in each hop), a systematic design for single-tone with length 8 may be used for each hop. For example, $H_8$ may be used in one sub-carrier, and $\overline{H}_8$ may be used in another sub-carrier.

In certain aspects, a similar systematic bit for length 16 may be used (e.g., using a 16×16 Hadamard matrix, $H_{16}$). In this case, the 16 sequences may be orthogonal, however, that may not be the case if the systematic design for single-tone with length 8 is used for each hop (e.g., $H_8$ in one sub-carrier and $\overline{H}_8$ for another sub-carrier).

Certain aspects of the present disclosure provide a pilot design for multi-tone transmission with 8-BPSK. For 8-BPSK, the reference signal may have low peak-to-average power-ratio (PAPR) comparable to 8-BPSK data. In certain aspects, the same 8-BPSK construction as for data with a fixed known input may be used. The input signal may be determined with a systematic construction. For example, a 12×12 Hadamard $H_{12}$ may be used for 12 tones and 12 group of sequences, each of length 12.

Certain aspects of the present disclosure are generally directed to pilot design for multi-tone transmission which may have 3, 6, or 12 tones. 8-BPSK reference signal may be designed for multi-tone transmission where the signal construction is the same as for 8-BPSK. In certain aspects, a computer generated sequence (CGS) may be used for QPSK frequency domain reference signal, for multi-tone transmission. In case of 3 tone transmission, a total number of sequences may be 16 with QPSK. In certain aspects, the total number of sequences may be 12 base sequences, which may be new sequences that are not truncated version of the 6-tone sequences.

In certain aspects, the binary code sequence for transmission of reference signals may be designed based on a different modulation coding scheme as compared to a remaining portion of the channel. For example, where QPSK or 16-QAM is used for data transmission, the binary code sequence for transmission of reference signals may be designed based on 8-BPSK.

In case of 6 tone transmission, a total possible number of QPSK sequences of length 6 may be 1024. In some cases, for 6-tone transmission, the total number of sequences may be 14. A CGS may be obtained after applying PAPR and cross-correlation properties. In some aspects, cross-correlation may consider the cross correlation for sequences of length 6, as well as, cross correlation between sequences of length 6 and 12/24, and in some aspects, even more. Sequence length of 12 and more may correspond to 1 RB (and more) allocation in neighboring cells.

12 cyclic shifts may be defined for 6 tone transmission, as follows:

$$\bar{s}(n) = e^{j\frac{2\pi}{12}\alpha n} s(n)$$

where s(n) is the base sequence and $0 \le n < 6$, and $\alpha$ is the cyclic shift and $0 \le \alpha < 12$. In some cases, the cyclic shift may be determined based on at least one of a cell ID, a UE ID, or slot index.

In certain aspects, the available base sequence in a cell (e.g., for each number of tones) can be indicated to a UE by a system information block (SIB) message. However, in some cases, the available base sequence may be a function of cell ID. That is, the available base sequence may be cell ID modulated based on the length of the sequence for the respective number of tones. For example, for 3-tone transmissions, the available base sequence may be cell ID modulated by 12 (e.g., if sequence length is 12) and for 6-tone transmissions, the number of sequences may be cell ID modulated by 14 (e.g., if sequence length is 14).

In certain aspects, 3 cyclic shifts may be used for the 3-tone transmissions and 4 cyclic shifts may be used for 6-tone transmissions. In some cases, the cyclic shifts may be indicated to a UE by a SIB message (e.g., as opposed to DCI) which is broadcasted.

For each 3-tone base DMRS sequence, three cyclic shifts may be defined as follows:

$$\bar{r}(n) = e^{j\frac{2\pi}{3}\alpha n} r(n)$$

where r(n) is a base sequence where $0 \le n < 3$, and $\alpha$ is the cyclic shift where $0 \le \alpha < 3$. Moreover, for each 6-tone base DMRS sequence, four cyclic shifts may be defined as follows:

$$\bar{r}(n) = e^{j\frac{2\pi}{6}\alpha n} r(n)$$

where r(n) is a base sequence and where $0 \le n < 5$ and $\alpha$ is the cyclic shift where $0 \le \alpha < 5$.

When transmissions are bundled, choosing the same DMRS sequences for the entire bundle may result in collision of users from different cells. Certain aspects of the present disclosure are generally directed to reducing inter-cell interference. For example, for single tone transmissions, a scrambling sequence may be used to randomize the interference. In some aspects, for single tone transmissions, a different DMRS sequence may be used for each burst within a bundle. For multi-tone transmissions, different DMRS sequences may be selected to randomize the interference. For single-tone, and multi-tone transmissions, the random functions can be based on at least one of a cell-ID, a UE-ID, or a slot number. In certain aspects, a scrambling sequence may be used to generate DMRS for multi-tone transmissions.

In certain aspects, intra-cell interference may be reduced with cyclic shift. In this case, the cyclic shift may be function of at least one of a cell-ID, a UE-ID, or a slot number.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-b-b, b-b-b, b-b-c, c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for monitoring, means for indicating, and/or means for including, may comprise a processing system, which may include one or more processors, such as the TX processor 616, transmitter(s) 618, and/or the controller/processor 675 of the wireless base station 610 illustrated in FIG. 6, and/or the TX processor 668, the transmitter(s) 654, and/or the controller/ processor 659 of the user equipment 650 illustrated in FIG. 6. Means for transmitting and/or means for sending may comprise a transmitter, which may include TX processor 616, transmitter(s) 618, and/or the antenna(s) 620 of the wireless base station 610 illustrated in FIG. 6, and/or the TX processor 668, the transmitter(s) 654, and/or the antenna(s) 652 of the user equipment 650 illustrated in FIG. 6. Means for receiving may comprise a receiver, which may include RX processor 670, receiver(s) 618, and/or the antenna(s) 620 of the wireless base station 610 illustrated in FIG. 6, and/or the RX processor 656, the receiver(s) 654, and/or the antenna(s) 652 of the user equipment 650 illustrated in FIG. 6.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless node, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless node and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   determining at least one code sequence for use for a demodulation reference signal (DMRS) for a channel transmitted across one or more subframes using one or more tones within a bandwidth of a resource block (RB) allocated to the UE for narrowband communication, wherein the at least one code sequence for use for the DMRS is determined based at least in part on a product of a Hadamard sequence and a random sequence, wherein a length of the at least one code sequence for use for the DMRS depends, at least in part, on a bundling length of the channel; and
   transmitting the channel including the DMRS using the one or more tones.

2. The method of claim 1, wherein the Hadamard sequence is length 16.

3. The method of claim 1, wherein the Hadamard sequence is cell-ID dependent.

4. The method of claim 1, wherein the random sequence comprises a pseudo noise (PN) sequence or a Gold sequence.

5. The method of claim 4, wherein the PN or Gold sequence is reset in a first symbol of the at least one code sequence.

6. The method of claim 4, wherein the pseudo noise (PN) sequence and Gold sequence are common among multiple cells, and wherein the Hadamard sequence is cell ID dependent.

7. The method of claim 1, wherein the at least one code sequence is determined based at least in part on a product of a codeword from a linear cyclic code and a random sequence.

8. The method of claim 1, wherein:
the at least one code sequence is obtained from a code block having a high minimum Hamming distance, wherein the code block having the high minimum Hamming distance comprises a cyclic code block.

9. The method of claim 1, wherein the at least one code sequence is determined as a linear combination of a set of known basis vectors.

10. The method of claim 1, wherein the at least one code sequence is determined from a Hadamard matrix formed with orthogonal columns.

11. The method of claim 1, wherein the at least one code sequence is determined from at least first and second Hadamard matrices, wherein the first Hadamard matrix is formed with orthogonal columns and the second Hadamard matrix that is formed by flipping the first Hadamard matrix.

12. The method of claim 1, wherein the determining comprises determining:
a first code sequence for transmitting a first DMRS on a first tone selected from a first Hadamard matrix formed with orthogonal columns; and
a second code sequence for transmitting a second DMRS on a second tone selected from a second Hadamard matrix formed with orthogonal columns.

13. The method of claim 12, wherein the second Hadamard matrix is formed by flipping the first Hadamard matrix.

14. The method of claim 1, wherein:
a first code sequence for transmitting a first DMRS on a first tone is selected from a first Hadamard matrix; and
a second code sequence for transmitting a second DMRS on a second tone is also selected from the first Hadamard matrix.

15. The method of claim 1, further comprising:
receiving a system information block (SIB) message, wherein the SIB message comprises an indication of a base sequence, wherein determining the at least one code sequence is based at least in part on the indication.

16. The method of claim 1, wherein determining the at least one code sequence comprises determining a base sequence based on a cell-ID.

17. The method of claim 1, wherein the determination of the at least one code sequence is based on three cyclic shifts if the one or more tones comprise three tones, and wherein the determination of the at least one code sequence is based on four cyclic shifts if the one or more tones comprise six tones.

18. The method of claim 1, further comprising:
receiving a system information block (SIB) message, wherein the SIB message comprises an indication of a number of cyclic shifts, wherein determining the at least one code sequence is based at least in part on the indication.

19. The method of claim 1, wherein the at least one code sequence is determined from 12 base sequences if the one or more tones comprise three tones, and wherein the at least one code sequence is determined from 14 base sequences if the one or more tones comprise six tones.

20. The method of claim 1, wherein the at least one code sequence is transmitted with a Quadrature Phase Shift Keying (QPSK) modulation scheme in frequency domain.

21. The method of claim 1, further comprising applying a cyclic shift to the at least one code sequence, wherein the cyclic shift is determined based on at least one of a cell ID, a UE ID, or a slot index.

22. The method of claim 1, wherein the one or more subframes comprise a plurality of subframes and the determining comprises determining different code sequences for use for a DMRS for each of the plurality of subframes.

23. The method of claim 1, wherein the at least one code sequence is randomized using a scrambling sequence, wherein the scrambling sequence is determined based on at least one of a cell ID, a UE ID, or a slot number.

24. The method of claim 1, wherein the one or more tones comprise multiple tones, and wherein determining the at least one code sequence comprises determining different code sequences for each of the multiple tones.

25. A method for wireless communications by a base station, comprising:
determining at least one code sequence for use for a demodulation reference signal (DMRS) for a channel transmitted, by a user equipment (UE), across one or more subframes using one or more tones within a bandwidth of a resource block (RB) allocated to the UE for narrowband communication, wherein the at least one code sequence for use for the DMRS is determined based at least in part on a product of a Hadamard sequence and a random sequence, wherein a length of the at least one code sequence for use for the DMRS depends, at least in part, on a bundling length of the channel; and
monitoring the one or more tones during the one or more subframes for the channel including the DMRS.

26. The method of claim 25, wherein the Hadamard sequence is length 16.

27. The method of claim 25, wherein the Hadamard sequence is cell-ID dependent.

28. The method of claim 25, wherein the random sequence comprises a pseudo noise (PN) sequence or a Gold sequence.

29. The method of claim 28, wherein the PN sequence or the Gold sequence is reset in a first symbol of the at least one code sequence.

30. The method of claim 28, wherein the pseudo noise (PN) sequence and Gold sequence are common among multiple cells, and wherein the Hadamard sequence is cell ID dependent.

31. The method of claim 25, wherein the at least one code sequence is determined based at least in part on a product of a codeword from a linear cyclic code and a random sequence.

32. The method of claim 25, wherein:
the at least one code sequence is obtained from a code block having a high minimum Hamming distance, wherein the code block having the high minimum Hamming distance comprises a cyclic code block.

33. The method of claim 25, wherein the at least one code sequence is determined as a linear combination of a set of known basis vectors.

34. The method of claim 25, wherein the at least one code sequence is determined from at least a first Hadamard matrix formed with orthogonal columns.

35. The method of claim 25, wherein the at least one code sequence is determined from at least first and second Hadamard matrices, wherein the first Hadamard matrix is formed with orthogonal columns and the second Hadamard matrix that is formed by flipping the first Hadamard matrix.

36. The method of claim 25, wherein:
a first code sequence for transmitting a first DMRS on a first tone is selected from a first Hadamard matrix formed with orthogonal columns; and
a second code sequence for transmitting a second DMRS on a second tone is selected from a second Hadamard matrix formed with orthogonal columns.

37. The method of claim 36, wherein the second Hadamard matrix is formed by flipping the first Hadamard matrix.

38. The method of claim 25, wherein:
a first code sequence is determined for a first DMRS on a first tone is selected from a first Hadamard matrix; and
a second code sequence is determined for a second DMRS on a second tone is also selected from the first Hadamard matrix.

39. The method of claim 25, further comprising:
transmitting a system information block (SIB) message, wherein the SIB message comprises an indication of a base sequence used to determine the at least one code sequence.

40. The method of claim 25, wherein determining the at least one code sequence comprises determining a base sequence based on a cell-ID.

41. The method of claim 25, wherein the determination of the at least one code sequence is based on three cyclic shifts if the one or more tones comprise three tones, and wherein the determination of the at least one code sequence is based on four cyclic shifts if the one or more tones comprise six tones.

42. The method of claim 25, further comprising:
transmitting a system information block (SIB) message, wherein the SIB message comprises an indication of a number of cyclic shifts used to determine the at least one code sequence.

43. The method of claim 25, wherein the at least one code sequence is determined from 12 base sequences if the one or more tones comprise three tones, and wherein the at least one code sequence is determined from 14 base sequences if the one or more tones comprise six tones.

44. The method of claim 25, wherein the at least one code sequence is transmitted with a Quadrature Phase Shift Keying (QPSK) modulation scheme in frequency domain.

45. The method of claim 25, wherein the monitoring comprises monitoring for a cyclic shift applied to the at least one code sequence by the UE, wherein the cyclic shift is determined based on at least one of a cell ID, a UE ID, or slot index.

46. The method of claim 25, wherein the one or more subframes comprise a plurality of subframes and the determining comprises determining different code sequences for use as a DMRS for each of the plurality of subframes.

47. The method of claim 25, wherein the at least one code sequence comprises a scrambling sequence, wherein the scrambling sequence is determined based on at least one of a cell ID, a UE ID, or a slot number.

48. The method of claim 25, wherein the one or more tones comprise multiple tones, and wherein determining the at least one code sequence comprise determining different code sequences for each of the multiple tones.

49. An apparatus for wireless communications by a user equipment (UE), comprising:
means for determining at least one code sequence for use for a demodulation reference signal (DMRS) for a channel transmitted across one or more subframes using one or more tones within a bandwidth of a resource block (RB) allocated to the UE for narrowband communication, wherein the at least one code sequence for use for the DMRS is determined based at least in part on a product of a Hadamard sequence and a random sequence, wherein a length of the at least one code sequence for use for the DMRS depends, at least in part, on a bundling length of the channel; and
means for transmitting the channel including the DMRS using the one or more tones.

50. An apparatus for wireless communications by a base station, comprising:
means for determining at least one code sequence for use for a demodulation reference signal (DMRS) for a channel transmitted, by a user equipment (UE), across one or more subframes using one or more tones within a bandwidth of a resource block (RB) allocated to the UE for narrowband communication, wherein the at least one code sequence for use for the DMRS is determined based at least in part on a product of a Hadamard sequence and a random sequence, wherein a length of the at least one code sequence for use for the DMRS depends, at least in part, on a bundling length of the channel; and
means for monitoring the one or more tones during the one or more subframes for the channel including the DMRS.

51. An apparatus for wireless communications by a user equipment, comprising:
at least one processor; and memory coupled to the at least one processor, the memory comprising instructions executable by the at least one processor to cause the apparatus to:
determine at least one code sequence for use for a demodulation reference signal (DMRS) for a channel transmitted across one or more subframes using one or more tones within a bandwidth of a resource block (RB) allocated to the UE for narrowband communication, wherein the at least one code sequence for use for the DMRS is determined based at least in part on a product of a Hadamard sequence and a random sequence, wherein a length of the at least one code sequence for use for the DMRS depends, at least in part, on a bundling length of the channel; and
transmit the channel including the DMRS using the one or more tones.

52. An apparatus for wireless communications by a base station, comprising:
at least one processor; and memory coupled to the at least one processor, the memory comprising instructions executable by the at least one processor to cause the apparatus to:
determine at least one code sequence for use for a demodulation reference signal (DMRS) for a channel transmitted, by a user equipment (UE), across one or more subframes using one or more tones within a bandwidth of a resource block (RB) allocated to the UE for narrowband communication, wherein the at least one code sequence for use for the DMRS is determined based at least in part on a product of a Hadamard sequence and a random sequence, wherein a length of the at least one code sequence for use for the DMRS depends, at least in part, on a bundling length of the channel; and
monitor the one or more tones during the one or more subframes for the channel including the DMRS.

53. A non-transitory computer-readable medium for wireless communication by a user equipment (UE), the non-transitory computer-readable medium comprising code, which when executed by at least one processor, causes the at least one processor to:
determine at least one code sequence for use for a demodulation reference signal (DMRS) for a channel transmitted across one or more subframes using one or more tones within a bandwidth of a resource block (RB) allocated to the UE for narrowband communication, wherein the at least one code sequence for use for the DMRS is determined based at least in part on a product of a Hadamard sequence and a random sequence, wherein a length of the at least one code sequence for use for the DMRS depends, at least in part, on a bundling length of the channel; and transmit the channel including the DMRS using the one or more tones.

54. A non-transitory computer-readable medium for wireless communication by a base station, the non-transitory computer-readable medium comprising code, which when executed by at least one processor, causes the at least one processor to:

determine at least one code sequence for use for a demodulation reference signal (DMRS) for a channel transmitted, by a user equipment (UE), across one or more subframes using one or more tones within a bandwidth of a resource block (RB) allocated to the UE for narrowband communication, wherein the at least one code sequence for use for the DMRS is determined based at least in part on a product of a Hadamard sequence and a random sequence, wherein a length of the at least one code sequence for use for the DMRS depends, at least in part, on a bundling length of the channel; and monitor the one or more tones during the one or more subframes for the channel including the DMRS.

* * * * *